Figure 1:
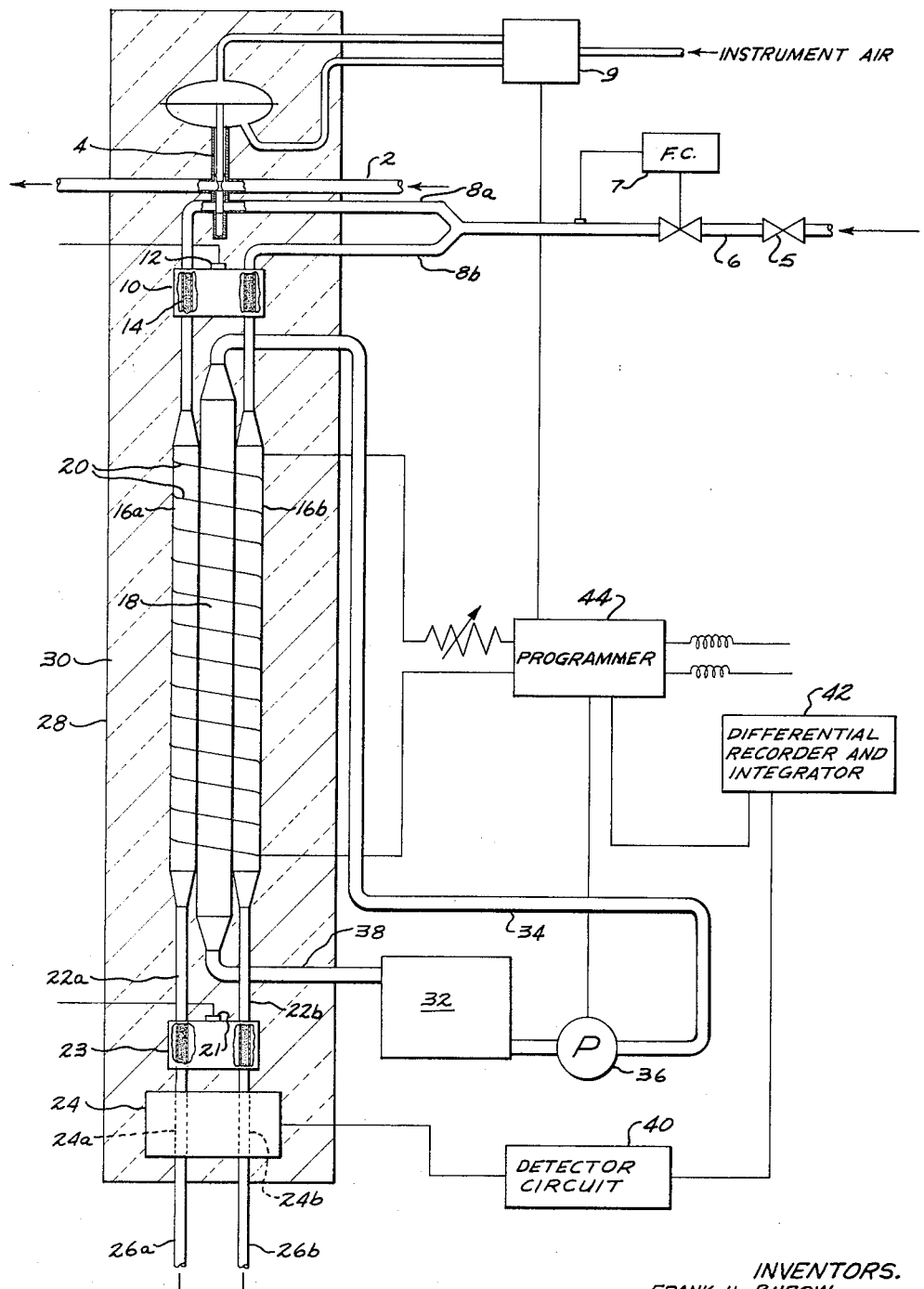

Feb. 1, 1966

F. H. BUROW ET AL 3,232,093

GAS CHROMATOGRAPHY APPARATUS

Filed March 7, 1962

3 Sheets-Sheet 1

INVENTORS.
FRANK H. BUROW
RALPH O. CLARK
DEAN H. LICHTENFELS
BY JAMES A. PETROCELLI

ATTORNEY

INVENTORS.
FRANK H. BUROW
RALPH O. CLARK
DEAN H. LICHTENFELS
JAMES A. PETROCELLI

ATTORNEY

United States Patent Office 3,232,093
Patented Feb. 1, 1966

3,232,093
GAS CHROMATOGRAPHY APPARATUS
Frank H. Burow, Cheswick, Ralph O. Clark, Verona, Dean H. Lichtenfels, New Kensington, and James A. Petrocelli, North Versailles Township, Allegheny County, Pa., assignors to Gulf Research & Development Company, Pittsburgh, Pa., a corporation of Delaware
Filed Mar. 7, 1962, Ser. No. 178,012
2 Claims. (Cl. 73—23.1)

This invention relates to chromatographic apparatus for analyzing fluid mixtures, and more particularly, to fully automatic temperature-programmed apparatus for analyzing fluid mixtures having a relatively wide boiling range by gas chromatography.

In many industrial processes product quality is regulated and/or process control is effected in accordance with the distillation properties, product composition or other properties of products obtained at one or more stages of manufacture. For example, in the petroleum industry the quality of gasoline, naphtha, kerosene, jet fuel and similar products are frequently adjudged and controlled in part by the distillation properties of these materials as determined by the ASTM D–86 distillation test procedure. As a consequence, routine laboratory distillation and other types of analysis for purposes of process or product control consume much operator time in many industries.

It has been previously recognized that single component analysis and multicomponent qualitative and quantitative analysis can be carried out with the use of chromatographic separation. It has also been recognized that the retention times for the components of a fluid mixture separated in a chromatographic column are a function of the boiling points of these components, although the actual output of a chromatographic separation column is not normally obtained in terms of the component's boiling points, but in terms of the concentration in the column effluent of the respective components of the mixture and the time of retention in the column for these components. When a rising temperature or temperature-programmed chromatographic column is used in the separation of a fluid mixture, and the rate of temperature rise is substantially linear, the relation between retention times for the components of a mixture separated in the column and the boiling points of these components is nearly linear.

Because of the relationship between the boiling points of the components of a fluid mixture and the corresponding retention times in a chromatographic column, it has been proposed to employ temperature-programmed chromatographic separation apparatus in lieu of distillation apparatus as a means of determining the distillation characteristics of fluid mixtures. Although more information as to the composition of a mixture subjected to analysis is obtainable by chromatographic operation than by simple distillation, and although such information is obtainable in a relatively short time by temperature-programmed chromatographic separation as compared with distillation, the temperature-programmed chromatographic separation apparatus hitherto proposed for use in place of conventional distillation or analytical apparatus has not been fully satisfactory from the standpoint of freedom from attention or adaptability to automation. Thus, temperature-programmed chromatographic separation apparatus heretofore proposed for use in place of laboratory distillation apparatus or other analytical apparatus has required the attention of an operator in commencing each analytical cycle. Consequently, operator time consumption for the operation performed has remained high, notwithstanding automatic operation of the apparatus after startup. Moreover, the temperature-programmed chromatographic apparatus heretofore proposed as a substitute for distillation apparatus has not been of a design permitting rapid and substantially uniform heating and cooling of the chromatographic column, except perhaps for very short columns, in which instances the resolution of the components of the fluid mixture subjected to analysis is markedly restricted. In addition, such previously proposed apparatus has not been of a design such as to permit analytical information to be taken directly from the instrument without correction, at least with respect to materials having higher boiling points.

The present invention relates to a temperature-programmed apparatus for analyzing a multicomponent fluid mixture having a relatively wide boiling range that is capable of fully automatic, on-line operation, whose design is adaptable for use with chromatographic columns of any length to obtain analytical information of varying degrees of particularity, as a result of which operator requirements are greatly reduced, the utility of the apparatus is expanded, and the desired analytical information can be obtained in greater detail and with greater accuracy and speed. The apparatus of this invention includes, among other things, the combination of a chromatographic separation column, means for establishing a flow of carrier gas through the column, and means for introducing a sample of a fluid mixture to be analyzed into the column. When the sample is in liquid form, the apparatus should also include means for vaporizing the sample prior to its introduction into the separation column. The apparatus also includes cooling means contiguous with the external surface of said column and disposed substantially uniformly along the length of the column for cooling the column and its contents to a predetermined temperature. Heating means are also provided contiguous with the external surface of the column and disposed substantially uniformly along the length of the column for gradually heating the column and its contents to a predetermined temperature in a substantially uniform manner. The apparatus further includes detecting means for detecting the separated components of the fluid mixture as they emerge from the column. There is also provided sequence controlling means associated with the aforesaid heating means, the aforesaid cooling means and the aforesaid sample introducing means to produce a predetermined sequence and duration of operation thereof.

The chromatographic columns of the herein-disclosed apparatus can be either adsorption columns or partition columns, insofar as the principles of the invention are concerned. As is well known, separation of mixtures in adsorption chromatographic columns occurs as a result of differential adsorption of the components of the mixture subjected to analysis on the surfaces of an adsorptive solid. On the other hand, separation in partition chromatographic columns occurs as a result of a partitioning between a mobile gas phase and a stationary liquid phase and will be governed by the solution properties of the liquid phase. The packing of chromatographic separation columns is a subject in itself, but it can be briefly mentioned here that when adsorption columns are used, the columns can be packed with an inert, porous solid such as diatomaceous earth, silica gel, or activated charcoal, usually having a bulk density less than 0.4 gram per ml. and a particle size between about 30 and 100 mesh, preferably between about 30 and 60 mesh. When partition columns are used, the columns can be packed with particles of an inert porous solid provided with a coating of a liquid or semiliquid material suitable for the particular fluid mixture undergoing separation. Celite-type kieselguhr and insulating brick made from the same material of the particle size range indicated are examples of suitable inert supporting materials for use in packed partition columns. Partition columns can also be used in which the inner wall of the column is employed as the solid support, as is the case in instances of coated capillary chromatographic columns.

A wide variety of liquid materials can be used as the stationary phase material in the partition chromatographic columns employed in the present invention. When rising temperature columns are used, as disclosed herein, in the separation of fluid mixtures having a substantial boiling point range, low volatile (high boiling point) liquid materials are preferred as the stationary phase material. An example of a stationary liquid or semiliquid phase material that has been found to be suitable for use in rising temperature partition columns that are useful in the present invention for separation of gasoline hydrocarbons at temperatures in the range of about 5° C. to 250° C. is silicone rubber. Examples of other suitable materials are silicone oils such as General Electric Company SF96(1000) silicone oil, which is useful at temperatures in the range of about 0° C. to 250° C., and silicone gums such as General Electric Company SE30 silicone gum, which is useful at temperatures as high as 300° C. Examples of other materials that are useful as liquid phase partition agents over other temperature ranges are polyethylene, squalane, and paraffin wax.

Any suitable carrier gas can be employed as the eluent fluid in the herein-disclosed apparatus. In every case the carrier gas must be a material that is less strongly held by the stationary phase than any of the components of the fluid mixture that is to be subjected to analysis. When the analytical instrument involves a detector utilizing the principle of thermal conductivity, as is the case with the apparatus illustrated in FIGURE 1 hereof, it is advantageous from the standpoint of high sensitivity of response to employ a carrier gas having a thermal conductivity considerably higher than any of the components of the fluid mixtures to be analyzed. Helium is an example of a preferred carrier gas, but other eluent fluids can be used. Examples of other carrier gases are hydrogen and argon.

Figure 2:
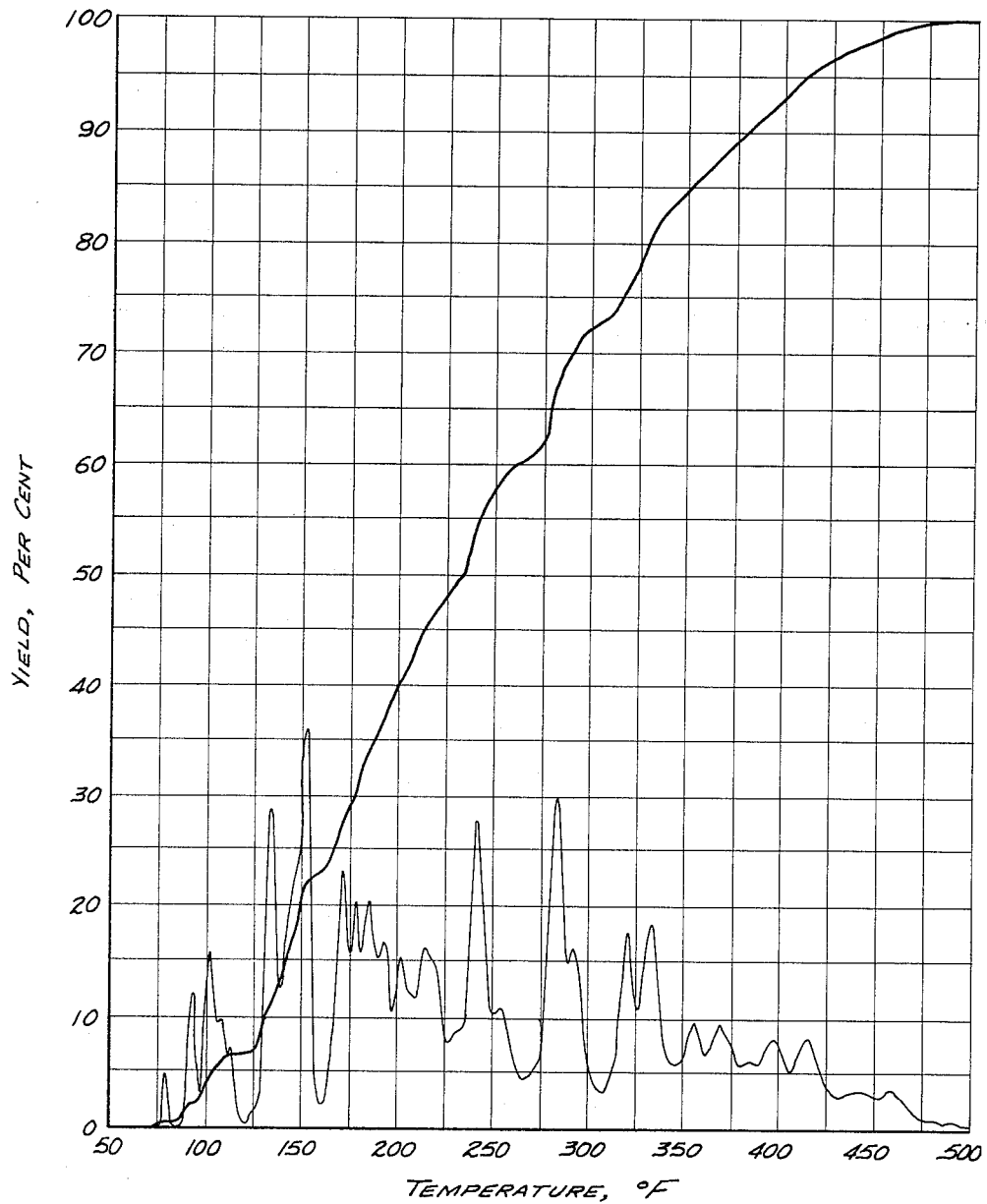
Figure 3:
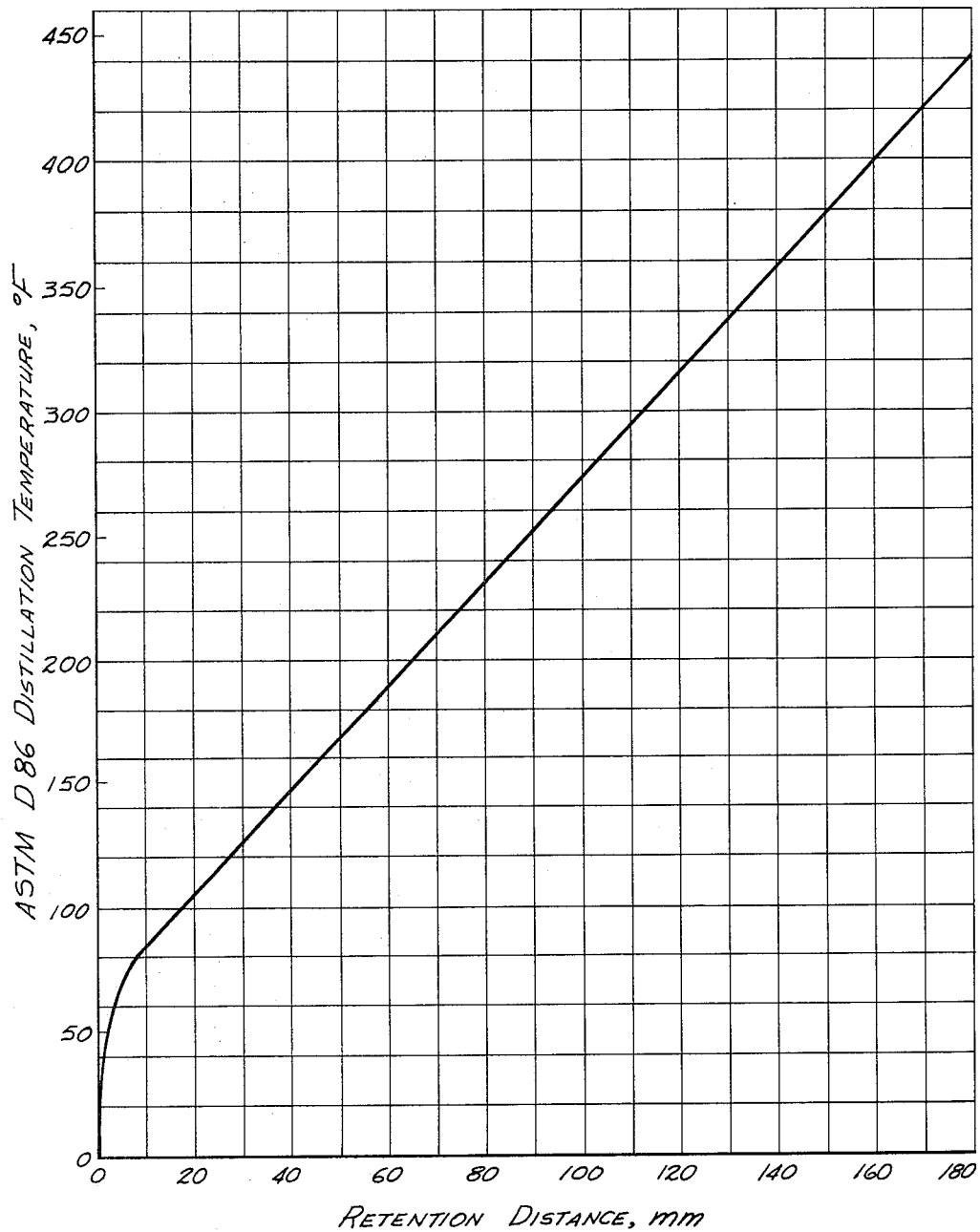

Referring now briefly to the drawings, FIGURE 1 is a diagrammatic representation, in front elevation, of one analytical instrument structure in accordance with this invention. FIGURE 2 is a reproduction of a recording chart of the type obtainable by the apparatus of FIGURE 1, showing a chromatogram, that is, a plot of the differential change in detector signal strength with time (lower curve), and a plot of the integral thereof (upper curve). FIGURE 3 is a calibration curve plotting the relationship between column retention time (as abscissa length in millimeters) and ASTM D86 boiling points for a gasoline hydrocarbon distillate.

Referring now to FIGURE 1 in detail, numerals 16a and 16b refer to duplicate, relatively thin-walled, tubular, chromatographic columns, the former being a separation column, and the latter being a reference column. By virtue of their tubular configuration, and for optimum heating and cooling, the inside diameters of these columns should constitute a major fraction of their outside diameters. Columns 16a and 16b are separated by a cooling column 18 disposed adjacent to and contiguous with and uniformly along the length of both columns 16a and 16b, for concurrently cooling the columns at substantially the same rate along their entire lengths to the desired starting temperature. Cooling column 18 is itself cooled by means of a suitable heat-exchange fluid, such as water, ethylene glycol, or even air, circulated therethrough at a predetermined time for a predetermined duration by pump means 36 and conduit means 34 and 38. The heat-exchange fluid in turn is cooled by passage through a refrigerated fluid reservoir in refrigeration means 32. Operation of pump 36 is controlled by programmer 44. Column 18 is preferably constructed of a material having a high coefficient of thermal conductivity such as copper or aluminum, to facilitate passage of heat out of columns 16a and 16b along the lines of tangency during the cooling phase of the cycle hereinafter described.

Columns 16a and 16b, together with cooling column 18, are wound with electrically conductive, insulated resistance wire 20 spaced substantially uniformly along the entire length of the three columns. These windings 20 form an electrical resistance heating means contiguous with the external surface of columns 16a and 16b. The heat transferred directly from these windings to the periphery of the columns 16a and 16b, together with the heat transferred from the windings indirectly through the cooling column 18, is adapted to heat the columns and their contents substantially uniformly from outside to center and at a substantially uniform rate along their entire lengths. The rate at which heating means 20 advances the temperature of the column is controlled by a variable resistance or rheostat.

The structure designated by numerals 5, 6, 7, 8a and 8b, together with a pressurized source, not shown, of an eluent fluid or carrier gas, comprises means for establishing duplicate, parallel flow of carrier gas through chromatographic separating column 16a and reference column 16b. Numeral 5 refers to a main carrier gas supply valve. Numeral 6 designates a main carrier gas supply conduit means defining a main stream of carrier gas from the pressurized source not shown. Numerals 8a and 8b refer to parallel branch carrier gas conduits connecting the main carrier gas conduit 6 and parallel chromatographic columns 16a and 16b. The rate of carrier gas flow through branch conduits 8a and 8b and through columns 16a and 16b is controlled by flow controller 7.

Numeral 4 indicates pneumatically controlled automatic sampling means—involving a notched piston sliding in a close fitting Teflon-lined cylinder connecting conduits 2 and 8a—for intermittently withdrawing and isolating a measured sample of the fluid mixture to be analyzed from the product stream flowing through sampling conduit means 2, and for introducing the samples so withdrawn into the chromatographic separating column 16a by way of the carrier gas stream flowing through branch carrier gas conduit 8a. The interval at which the sample injecting means 4 is operated is controlled by programmer 44. Sampling means 4 is operated by a diaphragm motor that in turn is operated by compressed air whose flow is regulated by a solenoid valve system 9 that is controlled by programmer 44. Although good results have been obtained with a standard pneumatically controlled sample injector manufactured by Micro-Tek Instruments, Inc., other equivalent pneumatically, hydraulically or electrically operated sampling devices can be used. The sample injecting means 4 is advantageously maintained at a constant, elevated temperature, by controlled heating means, not shown.

Element 10 comprises a flash chamber formed from a block of a heat-conductive metal such as aluminum, and containing duplicate, tubular passageways through which branch carrier gas conduits 8a and 8b pass in close contact. Conduits 8a and 8b are packed with a solid, particulate heat-exchange material 14, such as stainless steel metal particles or ribbon, in those portions surrounded by flash chamber 10. Flash chamber 10 comprises means for fully vaporizing the fluid mixture sample introduced into line 8a by sample injector 4, prior to introduction into separation column 16a. Flash chamber 10 is heated by a cartridge type electric heating means 12 embedded in the metal block that forms element 10.

Element 23 comprises another heating means constructed similarly as flash chamber 10. Heating means 23 functions to raise the effluent from columns 16a and 16b to a constant, common temperature.

Element 24 comprises detecting means responsive to changes in the composition of the effluent gas emerging from separating column 16a as compared with the composition of the effluent reference gas stream emerging from reference column 16b. There can be used any suitable detecting device that is capable of utilizing some property of the detected component to create an electrical current proportional to its concentration. We prefer to employ a differential detecting device, but integral detecting devices can be used when the ultimate analytical information to be obtained permits. Good results are obtainable by the use of conventional thermal conductivity detecting cells, as illustrated, but other differential detectors, including gas density balances, radiological ionization, and flame temperature detectors can be used. Where an integral detector is desired, gas volume or pressure increase detectors can be used.

The resistance elements in the parallel thermal conductivity cells 24a and 24b of detector 24 constitute resistances in two arms of a Wheatstone bridge detector circuit 40. Changes in the composition of the effluent emerging from separating column 16a produce a change in the electrical resistance of the resistance element in the thermal conductivity cell 24a associated with column 16a, whereby the bridge of circuit 40 becomes unbalanced and an electrical potential is developed commensurate with the magnitude of the change in the composition of the gas flowing through the thermal conductivity cell 24a. The electrical potential developed across the unbalanced resistance bridge, or alternatively, the externally applied electrical potential required to balance the bridge can be detected and recorded.

In the illustrated embodiment, numeral 42 denotes a recorder and integrator means for recording the differential change in the gas composition of the detector cell 24a with respect to time and for determining and recording the integral of such variation. However, depending upon the particular information desired by an operator, the recorder can be chosen to record either the differential variation in gas composition detected in cell 24a, or the integral variation, or both, as is the case in the illustrated embodiment. Thus, when the instrument is used solely to obtain a distillation analysis, the integral of the changes detected in cell 24a is all that is necessary, as the normalized integral curve can be read in terms of yield versus distillation temperature. When the instrument is used solely as a chromatographic stream analyzer, only the differential curve need be recorded, as this curve can be read qualitatively or quantitatively in terms of separated components or groups of components. Alternatively, in either instance, both curves can be recorded and the extra information that is obtained without additional analytical treatment of the sample can be regarded as an extra benefit obtainable by the use of the herein-disclosed instrument.

Numeral 44 denotes a programmer or sequence controlling means adapted to cause operation of cooling pump 36, sample injection means 4, heating means 20, detecting means 24, and recorder 42 in the desired sequence and for the desired duration. The structure of sequence controller 44 is conventional and can suitably take the form of a clock-driven shaft carrying a cam for each operation to be started and stopped, the cams being cut to operate switches, valves, etc., so as to provide the desired sequence and duration of operation of the means associated with such switches, valves, etc. However, other equivalent structures can be used.

Numeral 28 indicates the outline of a housing enclosing sampling means 4, flash chamber 10, colums 16a and 16b, heater 23, and detector 24. These elements are insulated against undesired temperature fluctuations by insulating material 30.

In operation, cartridge heaters 12 and 21 are switched on, as is the heater (not shown) for sample injector 4, and a flow of carrier gas such as helium is established through conduit 6, conduits 8a and 8b, chromatographic separating column 16a, reference column 16b, conduits 22a and 22b, detector cells 24a and 24b to vents 26a and 26b by opening carrier gas control valve 5. The flow of carrier gas through the respective parallel paths of flow is regulated at the desired rate by flow regulator 7. Programmer 44 activates pump 36 which circulates a heat exchange medium such as water from refrigerated reservoir 32 through line 34, cooling column 18 and line 38, by which means the temperature of the columns 16a and 16b is reduced quickly and uniformly to the desired starting temperature. Programmer 44 also effects balancing of the detector circuit bridge at the beginning of each cycle.

After carrier gas flow is established as described, after detector circuit 40 has been balanced, and after the desired starting temperature has been reached in flash heater 10, heater 23, and columns 16a and 16b, and after the chart drive of recorder 42 has been turned on, programmer 44 operates sampling means 4 causing injection of a sample of the process stream in sampling conduit 2 into carrier gas line 8a and flash chamber 14. The point of sample injection should be as close as possible to the flash chamber 14 to reduce smearing of the sample before vaporization. Programmer 44 now resets the recorder 42 to zero, and stops operation of pump 36, whereby cooling fluid, for example, water, drains from cooling column 18 to refrigerated reservoir 32. This feature is important as the total mass to be subsequently heated by means 20 is greatly reduced thereby, facilitating more rapid transfer of heat from windings 20 through column 18 to colums 16a and 16b.

Programmer 44 next turns on heating means 20 and resets sample injector 4. When the desired column temperature has been reached, that is, a temperature sufficient to permit elution with reasonable retention time of the highest boiling component of the fluid mixture to be analyzed, heater 20 and the chart drive of recorder 42 are turned off and pump 36 is started again to cool the columns 16a and 16b to starting temperature in preparation for a new cycle.

In a specific embodiment there was employed a chromatographic separation column formed from a two-foot length of stainless steel tubing having an outside diameter of ¼ inch, an inside diameter of $\frac{3}{16}$ inch, and containing a commercially obtainable column packing comprising Chromosorb P, a solid, porous, particulate siliceous material, having deposited thereon a silicone rubber comparable to General Electric SE–30 silicone rubber, in the amount of 20 percent by weight, said packing particles being of a size such as to pass a 60-mesh screen and be retained by an 80-mesh screen. This column packing material is marketed by the F & M Scientific Corporation. An identically constructed and packed column was also employed as the reference column. The cooling tube was formed from copper tubing having an outside diameter of ½ inch. The separation column, the reference column, and the cooling column were wound with about 40 feet of 26 gauge (B. & S.) asbestos-covered, Nichrome wire having a resistance of 2.5 ohms per foot that had been threaded into a fiberglass insulating sleeve. The sample injecting valve was a standard sample injector marketed by Micro Tek Instruments, Inc. For purposes of the particular analysis desired, the temperature of the thermal conductivity cell was controlled at 215° C. as was that of the heat exchanger just preceding the thermal conductivity cell. The temperature of the flash heater just preceding the column inlets was controlled at 210° C., and the temperature of the sample injector was controlled at 125° C. The thermal conductivity cell was a differential thermal conductivity cell of a type employing a Wheatstone bridge and constant filament currents of 100 milliamperes. The column temperature was programmed in the range of 40° F. to 350° F. by controlling the time during which an electrical current of predetermined magnitude, in this instance, 102 watts, was passed through the column heating means.

In the apparatus of this embodiment, when the instrument is started up all cartridge heaters are switched on, as is the cooling fluid pump, and the apparatus is allowed to reach thermal equilibrium. At the commencement of operations the recorder pens will be in the same position they were in at the close of the preceding cycle, the chart drive will be off, the column heater will be off, and the sample injector will be in the withdrawn position, that is, such as to permit continuous passage of the fluid stream to be analyzed through the process stream conduit. At the start of the analytical cycle the electrical resistance bridge in the thermal conductivity detector circuit is electrically balanced, and one minute later the programmer causes the piston member of the sample injector, together with a trapped, measured quantity of the fluid to be analyzed, to be displaced into the stream of carrier gas that is flowing into the flash chamber and thence into the chromatographic separation column. After one minute and 30 seconds the programmer causes the piston member of the sample injector to be withdrawn to its original position. After one minute and 45 seconds the programmer causes the recording pens to be reset to zero. At two minutes after the start of the analytical cycle the chart drive is switched on by the programmer. At two minutes and 15 seconds after the start of the analytical cycle, the cooling fluid pump is switched off and the cooling fluid is allowed to drain from the cooling column into the fluid reservoir of the refrigerating means. Five seconds later, the programmer switches on the column heater coil, and over a period of about 14 minutes and 40 seconds the column temperature increases from 40° F. to 350° F. At the conclusion of the heating cycle, which is 17 minutes after the start of the analytical cycle, the current to the column heating coil is switched off by the programmer and the cooling fluid pump is switched on to cool the column down to the initial starting temperature of 40° F., whereby the instrument is made ready for a new analytical cycle.

In a particular instance employing the apparatus of the above-described embodiment and utilizing the instrument conditions and cycle sequence described to obtain ASTM D86 boiling points for a sample of a gasoline motor fuel boiling in the range of about 73° F. to about 500° F. a plot of the differential change in the effluent from the column with respect to time—corresponding to the lower curve in FIGURE 2 of the drawings—was obtained. The various peaks in this curve correspond to the successively higher boiling components of the sample mixture detected by the thermal conductivity cell as they emerge successively from the separation column, and the area beneath the respective peaks corresponds to the relative quantity of the corresponding components. The upper curve of FIGURE 2 corresponds to the integral of the detector signal strength variation indicated in the lower curve. To interpret the integral curve, the curve is first normalized—if this has not been done by previous adjustment of the recorder—by dividing the same into a plurality of segments having equal height along the ordinate. These gradations correspond to the percent of product obtained ranging from 0 to 100 percent. Next, ASTM D86 boiling points are laid off along the abscissa. When these operations have been completed, the various ASTM D86 distillation points such as the 10 percent point, 50 percent point, and 90 percent ASTM distillation points of the sample can be read directly from the curve, as illustrated in FIGURE 2, just as is the case with the distillation curve obtained in a conventional ASTM D86 distillation, except that in the present instance the analysis is obtained entirely automatically, and except that additional information is obtainable from the differential curve, such as the identity of the respective components and/or groups of components of the sample mixture and the proportion thereof in the mixture, that would not be obtainable from the conventional ASTM D86 distillation procedure.

The correlation of ASTM D86 distillation temperatures with retention time or retention distance utilized in laying off the temperature segments on the recording chart is obtained from a correlation curve of the kind shown in FIGURE 3 of the attached drawings. The correlation curve is obtained in the first instance by plotting actual distillation temperatures of a gasoline hydrocarbon mixture obtained by the conventional ASTM D86 procedure against the retention times, or what amounts to the same thing, retention distances for the corresponding distillation points for the same mixture, as determined from the integral curve obtained by passing the calibration mixture through the instrument, using the instrument conditions and cycle sequence to be used in the desired analytical cycle. Having once correlated retention time or retention distance against ASTM D86 distillation temperatures for a multicomponent mixture of a given type, the same correlation can be used to interpret each recording chart thereafter obtained in the analysis of successive process stream samples.

Although the reproduction of the recording chart shown in FIGURE 3 indicates both a differential curve and the integral thereof, it will be appreciated that the instrument can be operated to record only the integral curve or only the differential curve. In the former case the instrument would produce only the cumulative distillation point information, and in the latter case the instrument would produce qualitative and quantitative information relative to each respective component of the multicomponent fluid mixture subjected to analysis.

It will be understood that the apparatus of this invention is not limited to use as a substitute for ASTM D86 distillation. As indicated, the apparatus is highly flexible and can be made to simulate other types of distillations and can also be used simply as an on-line chromatographic analytical device. It will also be understood that the invention is not limited to the method of data presentation indicated in FIGURE 2. For example, the integral change in the composition of the effluent as detected by suitable integrating means can be monitored automatically at desired points, for example, in an ASTM D86 distillation, the 10 percent, 50 percent and 90 percent distillation points, and the thus-determined temperatures can be printed directly for use by an operator, or they can be coded for future retrieval, as desired.

Numerous modifications and alternative embodiments of the invention as disclosed herein will readily suggest themselves to those skilled in the art. Accordingly, we do not wish the scope of the invention to be limited by the embodiments disclosed herein but only by the scope of the claims appended hereto.

We claim:
1. Chromatographic analytical apparatus for analyzing a fluid mixture, comprising a tubular chromatographic separation column, electrical heating means for cyclically gradually heating the column and its contents substantially uniformly at a substantially linear rate from a predetermined starting temperature to a predetermined final temperature, cooling means for cyclically rapidly cooling the column and its contents to the same predetermined starting temperature promptly after each heating cycle, said cooling means comprising a cooling column adjacent the chromatographic separation column, a heat-exchange fluid for circulation through said cooling column, and means for circulating said heat-exchange fluid through said cooling column only during intermittent cooling phases and permiting removal of said heat exchange fluid during other phases, refrigerating means for cooling said heat exchange fluid to said predetermined starting temperature, means for introducing a sample of the fluid mixture to be analyzed into the chromatographic separating column, means for establishing a flow of carrier gas through said chromatographic separation column, detecting means for detecting the separated components of the fluid mixture as they emerge from the separation column, recording means for recording the integral of the change in the composition of the effluent from the chromatographic separation column with respect to retention time, and sequence controlling means associated with said sampling means, said heating means and said cooling means for producing a predetermined sequence and duration of operation of said means.

2. Chromatographic analytical apparatus for analyzing a fluid mixture, comprising a tubular chromatographic separation column whose internal diameter is a major fraction of the external diameter, a duplicate, parallel reference column, electrical heating means contiguous with the external surface of said separating column and said reference column and disposed substantially uniformly along the length of said columns for gradually raising said columns and their contents substantially uniformly at a substantially linear rate to a predetermined temperature, said heating means comprising electrical resistance heating element windings disposed uniformly along the length of said chromatographic separation column, said reference column, and said cooling column, and a variable resistance in series therewith, cooling means contiguous with the external surfaces of said separating column and said reference column along the length of said columns for cooling said columns and their contents to a predetermined starting temperature, said cooling means comprising a cooling column positioned between said separating column and said reference column, a heat exchange fluid for circulation through said cooling column, means for circulating said heat exchange fluid through said cooling column during intermediate cooling phases and permitting removal of said heat exchange fluid during other phases, means for introducing a sample of the fluid mixture to be analyzed into said chromatographic separation column, means for fully vaporizing said sample prior to introducing thereof into said separating column, means for establishing a flow of carrier gas through said separating column and said reference column, detecting means for detecting the separated components of the fluid mixture as they emerge from said chromatographic separating column, sequence controlling means in association with said sampling means, said cooling means and said heating means for producing a predetermined sequence and duration of operations of said means.

References Cited by the Examiner
UNITED STATES PATENTS 3,026,039 11/1962 Ayres _____ 73—23
3,097,517 7/1963 Bowen et al. _____ 73—23.1

OTHER REFERENCES

Nogare et al.: Analytical Chemistry, November 1959, vol. 31, No. 11, pages 1829–1832.

Emery et al.: Analytical Chemistry, April 1961, vol. 33, No. 4, pages 523–527.

Harrison et al.: Gas Chromatography, ed. by Desty Butterworths Sci. Pubs., London, 1958, pages 216–220.

LOUIS R. PRINCE, *Primary Examiner.*

ROBERT L. EVANS, RICHARD QUEISSER,
*Examiners.*